Feb. 21, 1933.  E. W. WESCOTT  1,898,701
TREATING SULPHIDE ORES
Filed April 6, 1927   3 Sheets-Sheet 3

Inventor
E. W. Wescott
By K. P. McElroy
Attorney

Patented Feb. 21, 1933

1,898,701

UNITED STATES PATENT OFFICE

ERNEST W. WESCOTT, OF NIAGARA FALLS, NEW YORK, ASSIGNOR, BY MESNE ASSIGNMENTS, TO SULPHIDE CORPORATION, A CORPORATION OF DELAWARE

TREATING SULPHIDE ORES

Application filed April 6, 1927. Serial No. 181,497.

This invention relates to treating sulphide ores; and it comprises a method of regaining iron as oxid and sulphur as elemental sulphur from sulphide ores containing iron by means of chlorin wherein the ore is chlorinated in such a manner as to set free elemental sulphur and produce ferrous and ferric chlorids, the iron being volatilized from the ore as ferric chlorid, the ferric chlorid condensed and revaporized and the vapors of ferric chlorid burnt with air to produce chlorin and oxid of iron, the ch'orin thus produced returning to the process for use anew; all as more fully hereinafter set forth and as claimed.

In a prior Patent, No. 1,552,786, of September 8, 1925, I have described and claimed a process of recovering iron as oxid from oxid ores containing the same by the use of chlorin. In this patented process, the oxygen of the iron oxid of the ore is removed by suitable reducing agents before or during chlorination and chlorination is effected with the quantity of chlorin necessary to produce ferric chlorid; the operation being at a temperature sufficient to volatilze the ferric chlorid formed. The ferric chlorid is condensed to separate it from waste gases and is thereafter again vaporized and the vapors are burned with preheated air. This gives oxid of iron and a mixture of nitrogen and chlorin. The richness of the mixture in chlorin may reach the theoretical amount; 34.4 volume per cents of chlorin; and ordinarily in the practice of the described invention I approach this richness.

The patented process of reduction and chlorination as described is only applicable to oxidized ores. I have now, however, found that by an analogous process, I can economically treat sulphide ores and, in so doing, can produce iron oxid therefrom with elemental sulphur as a by-product. The new process is particularly applicable to what are known as complex sulphide ores; those ores which contain zinc, lead, copper and other values, in addition to iron. It is also applicable to ordinary sulphide ores rich in iron, such as pyrites and pyrrhotite. In fact, I find the process of general applicability to sulphide ores containing iron, whether the iron is a major or a minor component. In the practice of the present process, as in the former process, I contemplate using the same chlorin over and over again; and this is practical, so far as the iron is concerned. However, to the extent that copper, nickel, cobalt, etc., are present in the ore, and leave the system as chlorids, some chlorin goes out of circulation.

In the present process, chlorin is used to displace the sulphur of sulphide ores as sulphur and to form chlorids of iron and the other metals present. The amount of chlorin brought into contact with the hot ore is restricted to the amount required for these purposes. The sulphur is produced as vapor and escapes the system as such, being condensed by suitable means. Conditions are so adjusted that neither free chlorin nor sulphur chlorid goes forward with the vapors of sulphur; there is no sulphur chlorid in the effluent mixture of gases and vapors. Chlorid of sulphur in the ultimate exit gases is undesirable, since it contaminates the elemental sulphur and carries chlorin out of the system in a form in which it is not readily regained. However, formation of sulphur chlorid within the system and its temporary existence is not, on the other hand, a disadvantage; it serves to chlorinate the ore. In the present process, I contemplate removing sulphur from the system as low temperature vapor, the temperature of the solid materials undergoing chlorination and of the passing vapors being around or above 300° C. at the point where the vapors leave the chlorinating system to go to the condenser. At this range of temperatures heavy metal chlorids are not volatile and do not go forward to contaminate the sulphur. The boiling point of sulphur is 444.5° C., but its vapor tension is sufficiently high to allow it to be as vapor at temperatures around and above 300° C. in the presence of sufficient inert diluent gases. For any particular ore, the temperature required to remove the sulphur as vapor can be determined by calculation. For example, with an ore carrying 20.40 per cent sulphur and requiring 42 per cent of chlorin for chlorination to ferrous chlorid, the chlorin being delivered as a 30 per cent gas, at 760 mm. pressure, the theoretical end temperature necessary to remove sulphur as vapor is 296° C.

The exothermic nature of the various chlorinating operations and the relatively low temperatures required, make the present invention convenient in practice, since a variety of apparatus becomes available for my purposes. There is also a considerable range of choice in structural materials. At the low temperatures which I use in removing sulphur vapors, volatilization, sintering, etc., of metallic chlorids can be avoided and pure sulphur obtained. At temperatures materially below the boiling point of sulphur the vapor tensions of ferrous chlorid and like chlorids (copper, cobalt, nickel, silver, zinc, etc., chlorids) are inappreciable and the sulphur vapors go forward free of chlorids condensable with liquid sulphur. Zinc chlorid is slightly more volatile than ferrous chlorid, and in the presence of zinc, I ordinarily use a little lower temperature than where zinc is absent.

All the chlorinating operations I contemplate can be carried out in successive zones in a single chamber; or successive operations can be carried out in successive but independent chambers. Each way of operating has its advantages in different cases. In the case of ore relatively free of gangue and with ores containing relatively small amounts of valuable metals other than iron, I find the single chamber method best adapted. For example, it is particularly applicable to pyrite and its concentrates containing practically no rock and not more than, say, 3 per cent of copper, zinc and lead in total. In the case of ore carrying considerable gangue and considerable amounts of metals other than iron, I frequently find it advantageous to use a plurality of chambers.

In the accompanying illustration,

Figure 1:
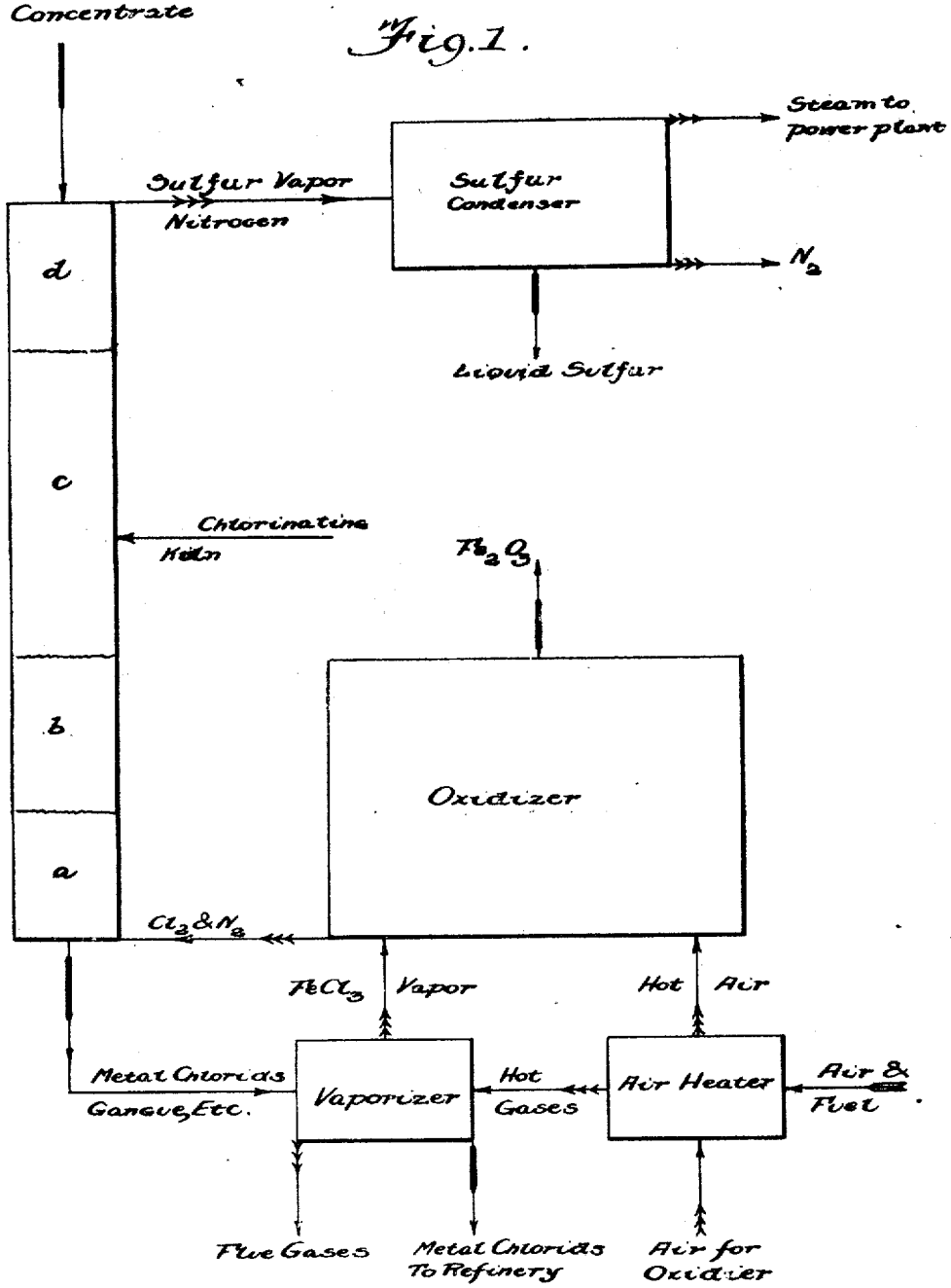
Figure 1 is a flow sheet of an operation using a single chlorinating chamber.
Figure 3:
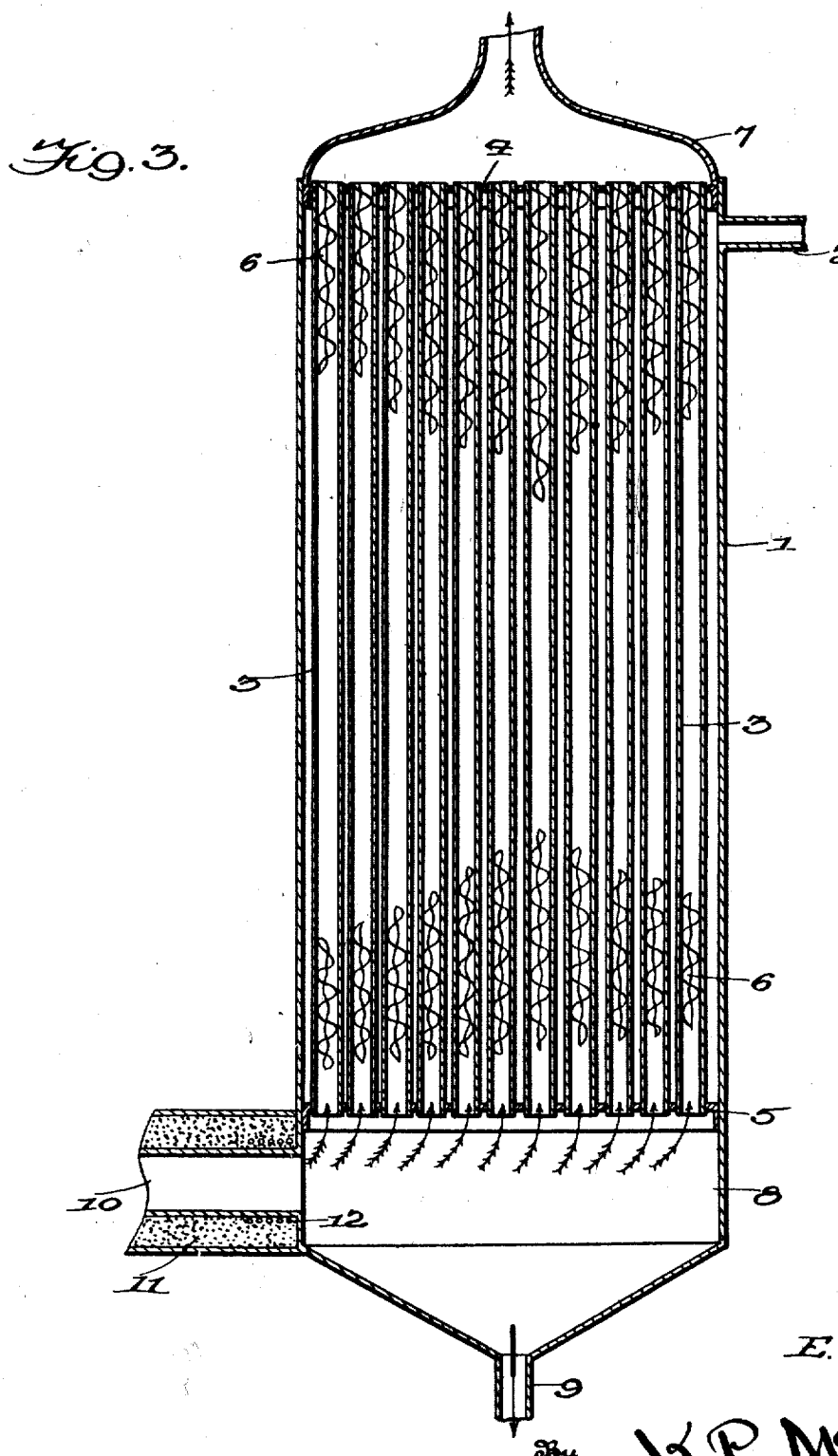
Figure 3 is a sectional view of a sulphur condenser.

I have carried out a process such as that diagrammed in Figure 1 with a particular pyrite carrying 44 per cent iron and about 50 per cent sulphur, with only 0.64 per cent silica. The lead, zinc and copper were, respectively, 1.08, 1.7 and 0.7 per cent. This ore was crushed to 40 mesh and dried, being somewhat damp. The ground material was fed into the upper end of a chlorinating kiln, which is so marked on the flow sheet. Interiorly, this kiln may be regarded as divided into various zones, $a$, $b$, $c$ and $d$. In zone $d$ at the head of the kiln, the ore was heated and the passing gases cooled and cleaned. Any ferric chlorid or sulphur chlorid present in the gases reaching this point reacted with the sulphides of the ore, setting free sulphur and forming solid ferrous chlorid. The temperature of the effluent gas-vapor mixture was also adjusted in zone $d$ to the desired degree, around 300° C. The gases leaving the kiln consisted of sulphur vapor and nitrogen and were free of the brown fumes of ferric chlorid and the strong odor of sulphur chlorid. Any dust accompanying the gases was allowed to settle out in ordinary dust collecting chambers, not shown. The hot mixture of sulphur vapor and nitrogen went to a sulphur condenser. A suitable condenser is shown in Figure 3.

Returning to the chlorinating kiln, the preheated materials leaving zone $d$ went down into zone $c$ where the ore was chlorinated by vapors of ferric chlorid and sulphur chlorid. Ordinarily only negligible amounts of free chlorin reached zone $c$. The solid materials leaving zone $c$ and going to zone $b$ consisted mainly of ferrous chlorid. The hot ferrous chlorid from zone $b$ passed into zone $a$ where it met a hot mixture of chlorin and nitrogen. The ferrous chlorid was converted into ferric chlorid and some portion of the latter was volatilized, the vapors passing upward in the kiln to react on ore as described. Some degree of cooling was usually necessary for zone $a$ in using rich ores. I controlled the temperature in zone $a$ so that while some ferric chlorid was volatilized, some was not; the amount of unvolatilized ferric chlorid leaving the apparatus per minute being about equivalent to the amount of chlorinatable iron entering zone $d$. It is not necessary that this control should be precise, but during the run, the amounts should balance. In this way of operating, there was a constant cyclic circulation of iron in $b$ and $c$ as ferric chlorid vapor and solid ferrous chlorid. The zone of most intense heat production was at $c$. If too much chlorin was fed or too little ore, the hottest part of zone $c$ tended to move slowly towards $d$. If, on the other hand, the supply of chlorin was deficient, the hot zone tended to move towards $b$. These migrations of zones were slow and readily allowed proper adjustment of the chlorin and ore supply without necessity for close watching or hurried changes. The solids discharged consisted of ferric chlorid with small amounts of heavy metal chlorids and gangue. I transferred these solids by means of a screw conveyor (not shown) to a vaporizer. Intermediate storage may be provided, but it is better to utilize the contained heat, sending the hot chlorid directly to the vaporizer. In this particular operation, as a vaporizer I used a furnace of the wedge type constructed of cast iron. This type of furnace has hollow hearths adapted to be heated by circulation of hot gases. In this instance, I found it convenient to use waste flue gases taken from the air heater used to furnish hot air for burning the ferric chlorid vapors. The oxidizer diagrammed in the flow sheet may be substantially that described in my acknowledged Patent 1,552,786. The discharged residues coming from the vaporizer were practically free of chlorids of iron.

Figure 2:
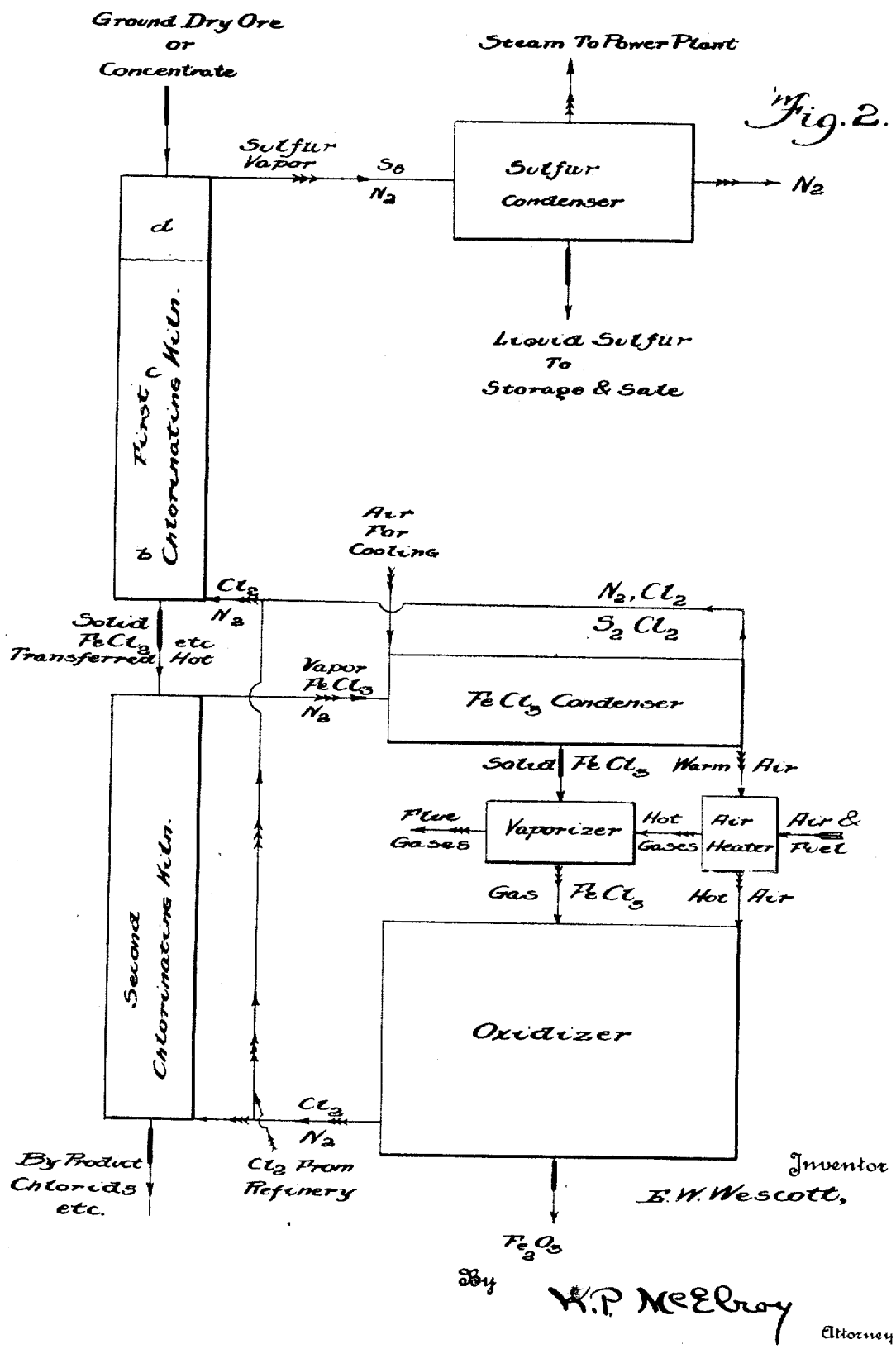
Figure 2 is a flow sheet of a 2-chamber operation.

In the flow sheet forming Figure 2, I have illustrated an operation in which the successive operations were carried out in successive chambers. In a typical operation, I used an ore from Sudbury, Canada, carrying a considerable amount of gangue and not very rich in iron. An analysis gave

| | | |
|---|---|---|
| Silica | 23.36 | per cent |
| Iron | 33.95 | per cent |
| Sulphur | 20.40 | per cent |
| Nickel and cobalt | 2.77 | per cent |
| Copper | 0.90 | per cent |
| Arsenic | 0.08 | per cent |
| Silver | 0.13 | ounces per ton |
| Gold | 0.003 | ounces per ton |
| Platinum | 0.004 | ounces per ton |

In this particular instance it was not regarded as economical to concentrate this ore and free it of gangue; making it suitable for the single chamber process of Figure 1. In the chlorinating apparatus used, I have shown only three zones, $d$, $c$ and $b$. These three zones have much the same functions as the corresponding zones in the flow sheet of Figure 1. The difference is in the absence of the zone $a$, with a comparatively ample supply of chlorin. In the operation of this flow sheet, the material discharged from zone $b$ contained its iron as ferrous chlorid, instead of as ferric chlorid. The discharged solid products went to a second chlorinating kiln where they were again treated with chlorin, the ferrous chlorid being thereby converted into ferric chlorid and also volatilized. This resulted in the discharge at the upper end of the second kiln of a mixture of ferric chlorid vapor and nitrogen which went to a ferric chlorid condenser. Solid ferric chlorid went from the condenser to a vaporizer and the vapors to an oxidizer as before.

Returning to the second chlorinating kiln, the mixture of chlorids and gangue going through was freed of iron by the action of chlorin and discharged at the lower end of the kiln. This mixture contained the nickel, cobalt, silver, gold and platinum stated in the analysis. As considerable heat is necessary in the second chlorinating kiln, I introduced the mixture of chlorin and nitrogen indicated on the flow sheet at a high temperature; between 550° C. and 750° C. I may note in this connection that, although these gases went in so hot, no portion of the apparatus reached such a temperature; the sensible heat of the gases being largely consumed in the vaporization of ferric chlorid. Nevertheless, I found it advisable in this operation to line the second kiln with refractory material in the neighborhood of the point of entrance of the hot gases.

In this particular operation I used a slight excess of chlorin in the second kiln in order to obtain iron-free chlorids in the discharged material. The exit gases going to the ferric chlorid condenser therefore contained chlorin and, when the conversion of sulphide to ferrous chlorid was not completed in the first chlorinating kiln, this gas contained sulphur chlorid as well. In the flow sheet I have indicated the expedient used in returning this chlorin to the system, namely, returning the gases after condensing the ferric chlorid back to the first chlorinating kiln, thereby utilizing the chlorin present. This practice of returning gases from the ferric chlorid condenser back to the first chlorinating kiln has the advantage of making necessary only one point of exit for gases from the system: through the sulphur condenser. I find that in this it is easy to keep the gases going through the sulphur condenser free of chlorin, sulphur chlorid and metal chlorids. In the operation of the flow sheet of Figure 2, no dust trap was necessary for the gases coming from the second chlorinating kiln. Any entrained dust or solid chlorids went with the ferric chlorid and was ultimately discharged from the vaporizer as residue.

It is necessary that ferric chlorid vapors in the piping be kept hot and for this reason I used piping well heat insulated. The temperatures within the piping should not fall below 300° C. and 325° C. is a safer minimum. If the heat insulation is not sufficient to maintain this temperature within the piping, extraneous heating must be resorted to. The vapors were burned at a temperature over 850° at the point of combustion, the air used for combustion being preheated sufficiently to maintain this temperature. The ferric chlorid vapors themselves were not preheated to any high temperature. The iron oxid produced in each of the operations just described was of great purity, carrying over 69 per cent of metallic iron with about 0.0014 per cent phosphorus and 0.004 per cent sulphur. The amount of silica and other bodies present was negligible.

In Figure 3, I have shown a satisfactory type of condenser enabling condensation of sulphur vapors in continuous operation. In the prior art, continuous condensation of sulphur and condensation as a liquid have been matters of extreme difficulty. I am not aware of any successful solution of this difficulty, which is attendant on the peculiar properties of molten sulphur. At some temperatures, molten sulphur is extremely viscous. The usual discontinuous methods of collecting sulphur from mixtures of its vapors with inert gases employed in making flowers of sulphur are all batch methods and are unsatisfactory in practice. I have found that all difficulties can be obviated by condensing the sulphur and removing it from the condenser as a liquid within the range of temperatures in which it is freely liquid, maintaining this temperature by the action of water under pressure. In other words, I use as a condenser a device analogous to a steam boiler and control the steam pressure, thereby controlling the temperature on the condensing walls. The best temperature to be maintained on the walls of the condenser exposed to the sulphur vapor is about 20° to 30° C. above the melting point of sulphur. The temperature should not go higher than 50° C. above the melting point. These temperatures can be readily maintained by using condensing means of the type of a vertical steam fire tube boiler run under a gage pressure between 15 and 75 pounds. With vertical tubes, the liquid sulphur runs down and can be readily collected. The steam generated by the condensation of sulphur is available for any use. In Figure 3, element 1 is a boiler shell provided with steam outlet 2 and carrying vertical tubes 3 between suitable headers 4 and 5 of an ordinary type. Within the tubes are helical strips 6 which can be removed when necessary through dome 7 of the apparatus. This dome carries away nitrogen. At its base, the apparatus is provided with a sulphur collecting chamber or sump 8 with outlet 9 at a low point. Entering this chamber is conduit 10 for the hot mixture of nitrogen and sulphur vapor. This pipe may be iron, jacketed with heat insulating material 11. As shown, within the heat insulation at the end of the pipe is a small electric heater 12, which is used to keep the vapor conduit from clogging with sulphur. This heater is rarely necessary, except during shut-downs and in operating at low capacity. The whole apparatus is best well heat insulated; and particularly the hopper or sump for molten sulphur.

Returning to the flow sheets, it will be noted that in Figure 1 ferric chlorid is delivered from the chlorinator in the solid state and elsewhere vaporized, while in Figure 2, ferrous chlorid is delivered from the first chlorinator to the second and the ferric chlorid is removed from the second chlorinator in the vapor state to be subsequently condensed and then again vaporized. In a general way, I prefer the operation of Figure 2 where there is much gangue or where the gangue contains finely disseminated sulphides; and likewise when the non-ferrous values are high. However, what can be done in the method of Figure 2 can be accomplished in the method of Figure 1, by the expedient of returning the residues from the ferric chlorid vaporizer for re-treatment. For the chlorinating operations, apparatus of the general type of that disclosed in my prior Patent, No. 1,406,596, may be employed. Or various commercial types of apparatus used for roasting and the like may be employed; for example, wedge type furnaces. Such a furnace may be constructed of chrome steel and the hearths adapted for the circulation of temperature controlling media. If such a furnace be employed for the double chlorination method of Figure 2, a seal is provided between the upper and lower sections with separate gas circulations for the two sections. Oil may be advantageously used as a heat controlling means. But, as preserving exact temperatures is a desideratum, it is sometimes more advantageous to use materials which can be made to boil at the range of temperatures set forth; using pressure or partial vacuo, as may be indicated. Mercury is suitable. Diphenyl oxid is preferable. I find it desirable to transfer the excess heat generated in the zone of most intense reaction to the ferric chlorid vaporizer by suitable circulation; there to be utilized in vaporizing ferric chlorid and effect a fuel economy. The chlorinating actions are quite exothermic and outside heating is rarely required unless the ore is heavily loaded with gangue and waste matter. Cooling may be necessary. With the range of temperatures I use in the single furnace method and in the first furnace of the two-furnace method, the apparatus may be made of ordinary heat resisting metals, such as nichrome or chrome steels. They can be used without a refractory lining, or with merely a thin lining. None of the actions here contemplated materially affects these metals at the range of temperatures here used, particularly if they are protected from any scouring by solids. In the two-furnace method, the metal walls in the second furnace should be protected from the hot entering gases, which may be at from 550° C. to 750° C., until these gases have been cooled by giving up their heat to volatilize ferric chlorid.

Where the present process is used on ordinary pyrites, as it may be, no solids leave the system other than gangue and traces of heavy metal chlorids. In this event, the recovery of chlorin for re-use is almost quantitative but a negligible amount of make-up chlorin being required. Where other values are contained in the ore, as is the case of the Sudbury ore cited as an example, chlorin disappears from the system to the extent that chlorids of other metals than iron are formed: nickel chlorid, cobalt chlorid, copper chlorid, silver chlorid, etc. Gold and platinum remain largely in the metallic state. These other chlorids, except for silver and lead chlorids, are soluble in water and are readily handled. Silver chlorid and lead chlorid in the presence of substantial amounts of certain other chlorids go into solution more or less completely with water. The solid chlorids contained in the material from which the iron has been removed may be treated by any of the ordinary chemical or metallurgical processes. Because of their nature, they are readily beneficiated. For example in treating such ore as the Sudbury ore, the solid residue may be dissolved in water and filtered. Some gold and silver remain behind but some goes into solution as chlorid. The solution may be precipitated to obtain the precious metals. Afterwards, the copper, cobalt or nickel may be regained in the customary ways.

In the methods of operation just stated, there is a fixed loss of chlorin from the system corresponding to the amount of non-ferrous chlorids. When, for any reason, this is inconvenient, their chlorin may be regained and the values recovered as oxids, by directly passing the solid material from the chlorinator into a rabbled muffle furnace. On treatment with hot air, the chlorids are oxidized, giving a mixture of chlorin and nitrogen with some excess air. This mixture is sent back to the system; usually, to the second chlorinating kiln.

The mixture of nitrogen and chlorin coming from the oxidizer is at a high temperature and its sensible heat aids in maintaining temperatures within the chlorinators. Sometimes, it is not convenient to deliver the chlorin-nitrogen mixture at the temperature at which it leaves the oxidizer. Sometimes, the gases may be stored for a time. In either event, there may be a slight deficiency of heat in the second kiln. When this is the case, the deficiency in heat may be obviated by so operating the first kiln that some unattacked ore passes into the second. Or a little fresh ore may be added to the chloridized ore going to the second kiln. In either event, the heat of chlorination of unattacked ore will furnish the additional heat units required for volatilizing ferric chlorid.

What I claim is:—

1. In the beneficiation of sulphide ores containing iron by chlorin, to recover sulphur and iron oxid, with cyclic use of chlorin, the process which comprises treating such an ore with the amount of chlorin necessary to displace sulphur as such with formation of ferrous chlorid, the treatment being at a temperature sufficient to vaporize the displaced sulphur, removing the resultant sulphur vapors from contact with ferrous chlorid and like chlorids at a temperature at the point of removal at which ferrous chlorid will not exist in vapor form to any appreciable extent but at a temperature sufficient to keep all the displaced sulphur in the vapor form, preparing vapors of ferric chlorid from the ferrous chlorid, burning such vapors to produce iron oxid and chlorin and returning the chlorin to serve anew in the stated operations.

2. In the beneficiation of sulphide ores containing iron and other values, the process which comprises treating such an ore with a dilute gaseous chlorinating agent in the amount required to displace the sulphur and form chlorids of the metals present while maintaining a temperature sufficient to cause the reaction of the chlorinating agent with the ore volatilizing the sulphur as such and thereafter volatilizing the iron present as vapors of ferric chlorid and recovering the other chlorids remaining in the unvolatilized residue.

3. The process of beneficiating sulphide ores in the dry way which comprises treating such an ore with a stream of chlorin in admixture with an inert gas at a temperature sufficient to remove sulphur as vapor and collecting and removing such vapors at a temperature below the normal boiling point of sulphur, the amount of chlorin supplied being less than that which will result in the appearance of any sulphur chlorid in the effluent sulphur vapors.

4. The process which comprises treating a sulphide ore containing iron with a dilute gaseous chlorinating agent in the amount required to convert the iron into chlorid and to form free sulphur but insufficient to form sulphur chlorid in the exit gases, while maintaining a temperature sufficient to cause the reaction of the chlorinating agent with the ore and successively removing free sulphur and ferric chlorid as vapors.

5. In the beneficiation of sulphide ores containing iron and other values, the process which comprises treating such an ore with a dilute gaseous chlorinating agent in the amount necessary to produce solid ferrous chlorid and free sulphur vapors but insufficient to produce sulphur chlorid in the exit gases, while maintaining a temperature sufficient to cause the reaction of the chlorinating agent with the ore, thereafter further chlorinating the ferrous chlorid to ferric chlorid and volatilizing the ferric chlorid as such, leaving a residue containing other chlorids.

6. In the beneficiation of sulphide ores containing iron, the process of removing the sulphur as such which comprises treating such an ore in a heated condition with a mixture of chlorin and nitrogen containing the amount of chlorin necessary to displace the sulphur as vapor with formation of ferrous chlorid and removing the mixture of sulphur vapors and nitrogen from contact with ferrous chlorid and like chlorids at a temperature at the point of removal below that at which such chlorids will exist in the vapor form.

7. In the beneficiation of sulphide ores by chlorination with recovered chlorinating materials, the process which comprises treating a sulphide ore containing iron at a reacting temperature with the amount of a gaseous chlorinating agent necessary to displace sulphur as such with formation of ferrous chlorid, the said chlorinating agent coming from a later operation and being sufficiently dilute so that a substantial temperature range exists within which ferrous chlorid in the presence of the diluent gases introduced with said chlorinating agent will not exist in vapor form to any appreciable extent but within which all the sulphur will remain in vapor form, vaporizing the displaced sulphur and removing the vapors from contact with ferrous chlorid and like chlorids at a temperature at the point of removal that is within said temperature range, preparing ferric chlorid vapors from the ferrous chlorid formed in the action and converting the ferric chlorid into a gaseous chlorinating agent and iron oxid.

8. In the beneficiation of sulphide ores by chlorination with recovered chlorinating substances, the process which comprises chlorinating fresh ore at temperatures and with amounts of a gaseous chlorinating agent insufficient to produce sulphur chlorid or ferric chlorid in the exit gases and thereafter treating the partially treated ore from the first operation with an excess of gaseous chlorinating agent, condensing ferric chlorid from the exit gases from the second operation, applying residual gases from the condensing step to the chlorinating of fresh ore, and preparing a gaseous chlorinating agent and iron oxid from the ferric chlorid.

9. In the benefication of materials containing iron sulphide with displacement of sulphur therefrom, the process which comprises chlorinating iron and other metals present with dilute chlorinating gases, removing the displaced sulphur from contact with produced metal chlorids as dilute vapors at a temperature at the point of removal below that at which ferrous chlorid and like chlorids will exist in the vapor form to any appreciable extent, the amount of chlorinating gases being insufficient to form sulfur chlorid.

10. In the beneficiation of sulphide ores by chlorin to recover sulphur and a metal oxid with a cyclic use of chlorin, the process which comprises treating a sulphide ore with a dilute gaseous chlorinating agent in the amount necessary to displace sulphur by chlorin with production of a metal chlorid, the sulphur being displaced as such, the treatment being at a temperature sufficient to vaporize the displaced sulphur with the aid of the diluent gases present, removing the resultant sulfur vapors from contact with formed metal chlorids at a temperature at the point of removal below that at which ferrous chlorid and like chlorids will exist in the vapor form, to any appreciable extent, oxidizing a produced metal chlorid with the aid of air to produce a metal oxid and regain a dilute gaseous chlorinating agent and returning said chlorinating agent to serve anew in the stated operations.

11. In the beneficiation of sulphide ores containing iron and other values by the cyclic use of chlorin, the process which comprises treating such a sulphide ore with a dilute gaseous chlorinating agent in the amount necessary to displace sulphur by chlorin and to produce ferrous chlorid and chlorids of other metals present, the sulphur being displaced as such, the treatment being at a temperature sufficient to vaporize the displaced sulphur with the aid of diluent gases present, removing the resultant sulphur vapors from contact with ferrous chlorid and like chlorids at a temperature at the point of removal at which ferrous chlorid will not exist in vapor form to any appreciable extent but at a temperature sufficient to keep all the displaced sulphur in the vapor form, preparing a dilute gaseous chlorinating agent and iron oxid from the ferrous chlorid and returning said chlorinating agent to serve anew in the stated operations.

12. The process which comprises treating a sulphide ore containing iron with dilute chlorin in the amount required to convert the iron into ferrous chlorid and free sulphur but insufficient to form sulphur chlorid in the exit gases, while maintaining a temperature sufficient to cause the reaction of the chlorinating agent with the ore, and successively removing free sulphur and ferric chlorid as vapors, said sulphur vapors being removed at a temperature at the point of removal below the boiling point of sulphur.

13. In the beneficiation of sulphide ores containing iron and other values, the process which comprises treating such an ore with a dilute gaseous chlorinating agent in an amount sufficient to produce ferrous chlorid and dilute vapors of free sulphur but insufcient to form sulphur chlorid in the exit gases, while maintaining a temperature sufficient to cause the reaction of the chlorinating agent with the ore, removing such sulphur vapors at a temperature at the point of removal below the boiling point of sulphur, thereafter converting the ferrous chlorid to ferric chlorid and volatilizing the ferric chlorid as such, leaving a residue containing other chlorids.

14. In the beneficiation of sulphide ores containing iron and other values by the use of dilute gaseous chlorinating agents with the production of pure sulphur therefrom, the steps in the process which comprise producing a body of dilute sulphur vapors at a temperature above the dew point of sulphur in the presence of the diluents and below that at which ferrous chlorid and like chlorids will exist in the vapor form to any appreciable extent and removing said sulphur vapors while retaining said chlorids in unvaporized form.

15. In the chlorination of sulphide ores containing iron to form iron chlorid and elemental sulphur, a process which comprises passing a chlorinating agant diluted with inert gases into contact with a charge of hot ore and withdrawing sulphur vapors diluted with said inert gases, the mixed gases and vapors being contacted before said withdrawal with freshly charged ore and removed from the system at a temperature below that at which ferrous chlorid has a substantial vapor tension, thereby obtaining sulphur substantially free of chlorine compounds.

16. In the chlorination of sulphide ores containing iron to form iron chlorid and elemental sulphur, a process which comprises feeding such an ore into one end of a chlorinating chamber, introducing at the other end a gaseous chlorinating agent diluted with inert gas, regulating the relative rates of feeding the ore and the gas to provide at least sufficient chlorin to convert the iron of the ore to ferrous chlorid and not more than enough to convert all the iron to ferric chlorid, removing sulphur vapor in the residual inert gases from near the ore feeding end of the chamber and removing the iron chlorids in unvaporized form from near the gas introducing end.

In testimony whereof, I have hereunto affixed my signature.

ERNEST W. WESCOTT.

CERTIFICATE OF CORRECTION.

Patent No. 1,898,701.  February 21, 1933.

ERNEST W. WESCOTT.

It is hereby certified that error appears in the printed specification of the above numbered patent requiring correction as follows: Page 1, line 93, after "be" insert "removed", and line 99, after "chlorination" insert the words "of the iron"; page 3, line 87, after "this" insert "way"; page 4, line 18, strike out the word "steam" and insert the same to follow "tube" in the same line; page 6, line 48, claim 10, strike out the article "a"; page 7, line 4, claim 15, for "agant" read "agent"; and that the said Letters Patent should be read with these corrections therein that the same may conform to the record of the case in the Patent Office.

Signed and sealed this 9th day of May, A. D. 1933.

M. J. Moore, (Seal)  Acting Commisioner of Patents.

15. In the chlorination of sulphide ores containing iron to form iron chlorid and elemental sulphur, a process which comprises passing a chlorinating agant diluted with inert gases into contact with a charge of hot ore and withdrawing sulphur vapors diluted with said inert gases, the mixed gases and vapors being contacted before said withdrawal with freshly charged ore and removed from the system at a temperature below that at which ferrous chlorid has a substantial vapor tension, thereby obtaining sulphur substantially free of chlorine compounds.

16. In the chlorination of sulphide ores containing iron to form iron chlorid and elemental sulphur, a process which comprises feeding such an ore into one end of a chlorinating chamber, introducing at the other end a gaseous chlorinating agent diluted with inert gas, regulating the relative rates of feeding the ore and the gas to provide at least sufficient chlorin to convert the iron of the ore to ferrous chlorid and not more than enough to convert all the iron to ferric chlorid, removing sulphur vapor in the residual inert gases from near the ore feeding end of the chamber and removing the iron chlorids in unvaporized form from near the gas introducing end.

In testimony whereof, I have hereunto affixed my signature.

ERNEST W. WESCOTT.

CERTIFICATE OF CORRECTION.

Patent No. 1,898,701.   February 21, 1933.

ERNEST W. WESCOTT.

It is hereby certified that error appears in the printed specification of the above numbered patent requiring correction as follows: Page 1, line 93, after "be" insert "removed", and line 99, after "chlorination" insert the words "of the iron"; page 3, line 87, after "this" insert "way"; page 4, line 18, strike out the word "steam" and insert the same to follow "tube" in the same line; page 6, line 48, claim 10, strike out the article "a"; page 7, line 4, claim 15, for "agant" read "agent"; and that the said Letters Patent should be read with these corrections therein that the same may conform to the record of the case in the Patent Office.

Signed and sealed this 9th day of May, A. D. 1933.

M. J. Moore, (Seal)   Acting Commisioner of Patents.

CERTIFICATE OF CORRECTION.

Patent No. 1,898,701.  February 21, 1933.

ERNEST W. WESCOTT.

It is hereby certified that error appears in the printed specification of the above numbered patent requiring correction as follows: Page 1, line 93, after "be" insert "removed", and line 99, after "chlorination" insert the words "of the iron"; page 3, line 87, after "this" insert "way"; page 4, line 18, strike out the word "steam" and insert the same to follow "tube" in the same line; page 6, line 48, claim 10, strike out the article "a"; page 7, line 4, claim 15, for "agant" read "agent"; and that the said Letters Patent should be read with these corrections therein that the same may conform to the record of the case in the Patent Office.

Signed and sealed this 9th day of May, A. D. 1933.

M. J. Moore.

(Seal)  Acting Commisioner of Patents.